US011982127B2

(12) United States Patent
Lajoie et al.

(10) Patent No.: US 11,982,127 B2
(45) Date of Patent: May 14, 2024

(54) LADDER SAFETY DEVICE

(71) Applicant: DELTA PREVENTION INC., Brossard (CA)

(72) Inventors: Alex Lajoie, St-Hyacinthe (CA); Pierre-Luc Lussier, Longueuil (CA); Kevin Key, St-Bruno-de-Montarville (CA)

(73) Assignee: DELTA PRÉVENTION INC., Brossard (CA)

( * ) Notice: Subject to any disclaimer, the term of this patent is extended or adjusted under 35 U.S.C. 154(b) by 603 days.

(21) Appl. No.: 17/083,856

(22) Filed: Oct. 29, 2020

(65) Prior Publication Data

US 2022/0136328 A1 May 5, 2022

(51) Int. Cl.
*E06C 7/48* (2006.01)
*E06C 1/36* (2006.01)
*E06C 7/18* (2006.01)

(52) U.S. Cl.
CPC ................ *E06C 7/488* (2013.01); *E06C 1/36* (2013.01); *E06C 7/182* (2013.01)

(58) Field of Classification Search
CPC .................................. E06C 7/488; E06C 1/36
See application file for complete search history.

(56) References Cited

U.S. PATENT DOCUMENTS 3,012,626 A * 12/1961 Marryatt .................. E06C 9/14 182/84
3,268,196 A * 8/1966 Anton, Sr. .............. E06C 7/486 248/316.4
3,510,097 A * 5/1970 McCaleb .................. E04G 3/20 182/150
3,664,626 A * 5/1972 Sneller ...................... G09F 7/18 248/224.7
4,276,957 A * 7/1981 Kilgore ..................... E04G 5/04 182/206
4,367,857 A * 1/1983 McCarthy ................. F16L 3/00 248/74.1
4,542,804 A * 9/1985 Power ...................... A62B 1/02 182/150
4,709,783 A * 12/1987 Tomioka ................. E06C 7/186 182/198

(Continued)

FOREIGN PATENT DOCUMENTS

CH 715315 A2 * 3/2020 ............ E06C 7/188
FR 2705398 A1 11/1994
KR 20110134121 A * 12/2011 ............ E06C 1/136

*Primary Examiner* — Jessica L Laux
*Assistant Examiner* — Kathleen M. McFarland
(74) *Attorney, Agent, or Firm* — LAVERY, DE BILLY, LLP; Gonzalo Lavin

(57) ABSTRACT

A ladder safety device (2) for removably securing a ladder (40) to a parapet wall (36) of a rooftop (38), including: a pair of support clamps (4) securable to the parapet wall (36), each said support clamp (4) including a first support member (10), a second support member (12), and an extended arm (14) joining said first support member (10) to said second support member (12), wherein a distance between said support members (10, 12) defines a width adjustable to the width of the parapet wall (36); an elongate plate (6) connecting said pair of support clamps (4) to each other; and at least one ladder hook (8) extending from said elongate plate (6) for securely receiving a rung of the ladder (40).

12 Claims, 20 Drawing Sheets

(56) References Cited

U.S. PATENT DOCUMENTS 4,765,439 A * 8/1988 Kresmery ................. E06C 7/48 182/206
5,265,742 A * 11/1993 Stenger ................. B66C 23/205 182/60
5,775,465 A * 7/1998 Vossler ..................... E06C 7/48 182/214
6,038,829 A * 3/2000 Franks ................ E04G 21/3242 52/645
6,045,102 A * 4/2000 Terenzoni ................. E04G 5/06 248/237
6,053,280 A * 4/2000 Smith ..................... E04G 5/048 182/150
6,135,300 A * 10/2000 Fox ....................... B66C 23/208 182/60
6,401,861 B1 * 6/2002 Marszalek ................ B60R 3/02 182/86
6,533,069 B1 * 3/2003 Couillard .................. E06C 7/48 182/83
6,578,666 B1 * 6/2003 Miller ..................... B60R 3/007 182/127
6,585,080 B2 * 7/2003 Murray ............... E04G 21/3242 248/231.71
6,907,957 B1 * 6/2005 Couch ....................... E06C 1/36 182/83
6,926,120 B1 * 8/2005 Bradley .................... E06C 7/16 182/129
7,066,299 B1 * 6/2006 Fleming .................... E06C 7/48 182/127
7,845,468 B2 * 12/2010 Steblinski ............... E02D 17/08 211/175
8,099,910 B1 * 1/2012 Gaines ................ E04D 13/0335 52/33
D669,194 S * 10/2012 Meyer ............................ D25/64
8,839,907 B2 * 9/2014 Davis, Jr. .................. E06C 7/48 182/106
9,004,227 B2 * 4/2015 Chilton ................... E06C 7/182 182/83
D757,302 S * 5/2016 Copp ............................. D25/68
9,540,875 B2 * 1/2017 Ellis ........................ E06C 7/182
9,551,183 B2 * 1/2017 Rudd ........................ F16B 2/12
9,567,804 B2 * 2/2017 Youlyahshiev ........... E06C 7/48
9,601,036 B2 * 3/2017 Barnard, IV .......... G09F 19/226
9,663,989 B2 * 5/2017 Moss ...................... E06C 1/397
9,797,195 B2 * 10/2017 DeCuir ................... E06C 7/486
9,890,590 B2 * 2/2018 Budziak .................. E06C 7/484
10,100,576 B1 * 10/2018 Dimovski ............. E04F 11/062
10,655,391 B1 * 5/2020 Clark ...................... E06C 7/488
10,900,282 B2 * 1/2021 Ford ....................... E06C 7/486
10,995,549 B2 * 5/2021 Kay ........................ E06C 7/188
2005/0045421 A1 * 3/2005 Gaines .................... E06C 7/482 182/107
2006/0201747 A1 * 9/2006 Walton ...................... E06C 1/36 182/206
2007/0175699 A1 * 8/2007 Steblinski ............ E02D 17/086 182/82
2007/0227819 A1 * 10/2007 Layfield .................... E06C 1/38 182/163
2008/0190692 A1 * 8/2008 Feik ........................ E06C 7/182 182/107
2009/0000868 A1 * 1/2009 Gaines .................... E06C 7/482 182/106
2011/0158783 A1 * 6/2011 Carlson ................... E06C 7/484 414/800
2012/0175188 A1 * 7/2012 Xu ............................ E06C 7/50 182/107
2013/0186710 A1 * 7/2013 Moss ...................... E06C 7/185 182/104
2014/0041965 A1 * 2/2014 Hess ......................... E06C 7/48 29/428
2014/0166397 A1 * 6/2014 Reynolds ................ E06C 7/188 29/428
2014/0262615 A1 * 9/2014 Copp ...................... E06C 7/188 248/231.9
2016/0108670 A1 * 4/2016 Youlyahshiev ........... E06C 1/36 182/206
2016/0208554 A1 * 7/2016 Harris ..................... E06C 7/188
2016/0215563 A1 * 7/2016 Ellis .......................... E06C 1/04
2018/0187486 A1 * 7/2018 Ford ....................... E06C 7/486
2018/0363373 A1 * 12/2018 Anderson ............... E06C 1/345
2019/0048663 A1 * 2/2019 Kay ........................ E06C 7/486
2020/0003008 A1 * 1/2020 Heitkamp ................. E06C 9/12
2020/0024900 A1 * 1/2020 Froese ...................... E06C 1/38

* cited by examiner

LADDER SAFETY DEVICE

FIELD OF THE INVENTION

The present invention relates to a ladder safety device, and more particularly to a ladder safety device for securing a mobile ladder to a rooftop.

BACKGROUND OF THE INVENTION

Ladders are often used to access the roof or sides of a building, for example for maintenance work and repairs. While useful, ladders can be very dangerous if they are not installed properly. Even if precautions are taken, such as ensuring the ladder base is on solid ground and the ladder is sufficiently angled relative to the building, unforeseen circumstances could knock the ladder off balance such as passerby's or strong gusts of wind.

A variety of systems currently exist to secure a ladder to the side of a building. These systems are typically complicated, cumbersome and must be permanently installed, such as by drilling and bolting. As such, there is a need for a device to secure a ladder to a building that is easily installable and removable, without damaging a rooftop with or without a parapet wall.

SUMMARY OF THE INVENTION

In order to address the above and other drawbacks, there is provided a ladder safety device for removably securing a ladder to a parapet wall of a rooftop comprising a pair of support clamps securable to the parapet wall, each support clamp comprising a first support member, a second support member, an extended arm joining the first support member to the second support member, and a width adjustable to the width of the parapet wall, an elongate plate connecting the pair of support clamps to each other, and at least one ladder hook extending from the elongate plate, wherein a rung of the ladder is securely receivable by the ladder hook.

In embodiments, the ladder safety device comprises a swiveling bracket connectable to said first support member, said swiveling bracket being pivotable between a first position where the bracket is operatively secured against the parapet wall and a second position where the bracket operatively rests onto the rooftop.

In embodiments, the extended arm comprises a plurality of through holes for receiving fasteners and removably connecting the first support member to the extended arm to selectively adjust the width of each the support clamp.

In embodiments, the extended arm comprises a plurality of ribbings and the first support member comprises a bolt, each ribbing engageable with the bolt to selectively adjust the width of each the support clamp.

In embodiments, the swiveling bracket is telescopically connectable to said first support member via at least one elongate slot, a male fastener and a female fastener, wherein said width of each support clamp is adjustable by adjusting the distance between said swiveling bracket and said first support member along said elongate slot via said male fastener and said female fastener.

In embodiments, the safety device further comprises a C-shaped bracket telescopically connected to the first support member via a plurality of elongate slots and fasteners and a threaded fastener, wherein the width of each support clamp is adjustable by adjusting the distance between the C-shaped bracket and the first support member via the threaded fastener.

In embodiments, at least one of the first support member and second support member comprises at least one end removably connectable to at least one of a hand rail or a guard rail.

In embodiments, each of the first support member and the second support member comprises a pad for applying pressure against the parapet wall.

In embodiments, each pad is made from one of rubber or hard plastic.

In an embodiment, the pair of support clamps, the elongate plate and the pair of ladder hooks are each made from aluminum.

In embodiments, the safety device further comprises at least one additional rail insertable into the at least one slot at a first end and comprising a counterweight at a second end, the counterweight engaging with the rooftop to counter the weight of a user using the ladder.

There is also provided a ladder safety device for removably securing a ladder to a rooftop with or without a parapet wall, comprising an elongate plate comprising a pair of ladder hooks and at least one slot, wherein a rung of the ladder is securely receivable by the ladder hooks, and at least one rail insertable into the at least one slot at a first end and comprising a counterweight at a second end, the counterweight engaging with the rooftop to counter the weight of a user using the ladder.

In embodiments, in case the roof has a parapet wall, the device includes a pair of support clamps securable to a parapet wall of the rooftop, each said support clamp comprising a first support member, a second support member, and an extended arm joining said first support member to said second support member, wherein a distance between said support members defines a width adjustable to the width of the parapet wall.

Other objects, advantages and features of the present invention will become more apparent upon reading of the following non-restrictive description of specific embodiments thereof, given by way of examples only with reference to the accompanying drawings.

BRIEF DESCRIPTION OF THE DRAWINGS

FIG. 12 is rear elevation view of the ladder safety device shown in FIG. 6;

DETAILED DESCRIPTION

The present invention is illustrated in further details by the following non-limiting examples.

Figure 1A:
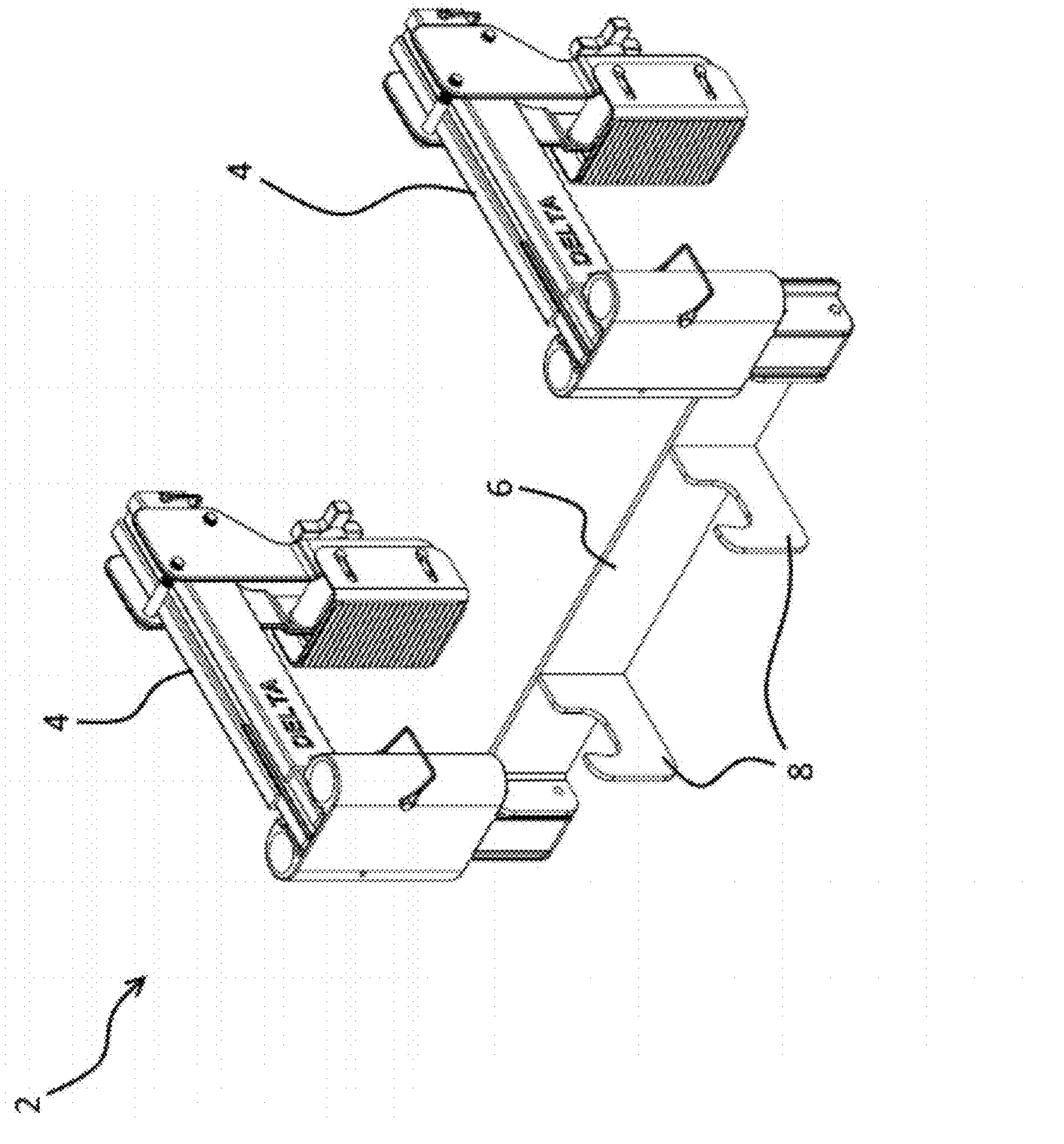
FIGS. 1A and 1B show respective front perspective and rear perspective views of a ladder safety device, according to a preferred embodiment of the present invention.
Figure 1B:
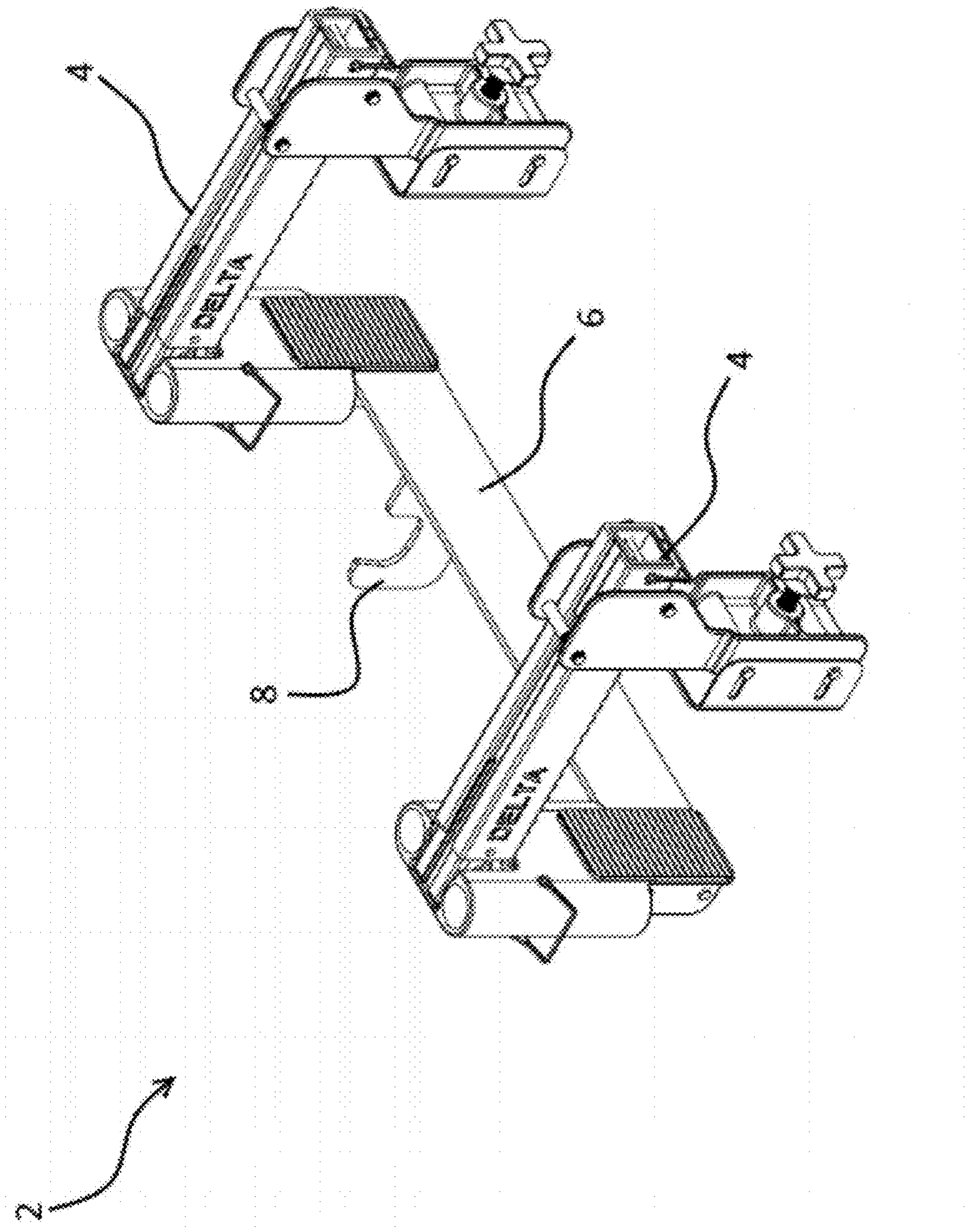
Figure 2B:
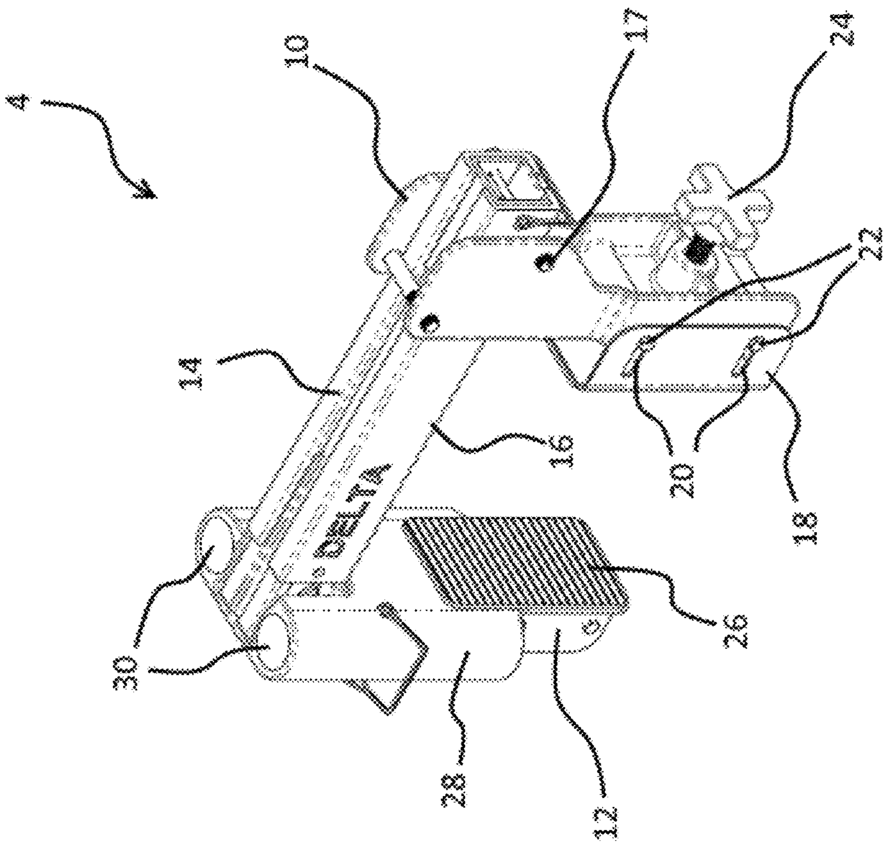
FIGS. 2A to 2D show respective front perspective, rear perspective, side and top views of a support clamp for the ladder safety device shown in FIGS. 1A and 1B.
Figure 2A:
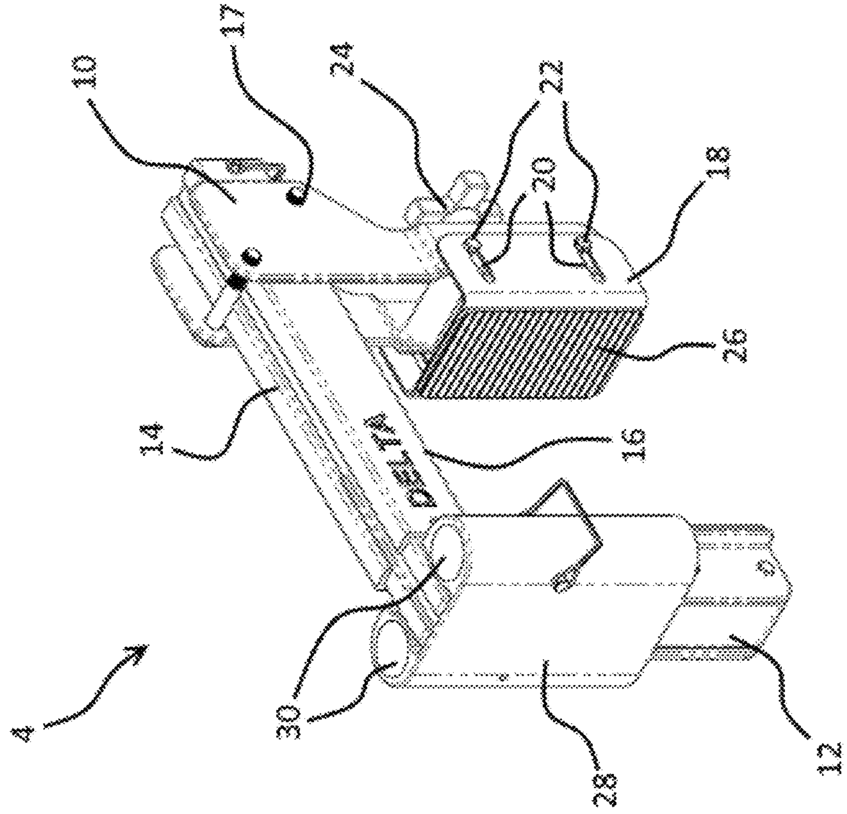
Figure 2D:
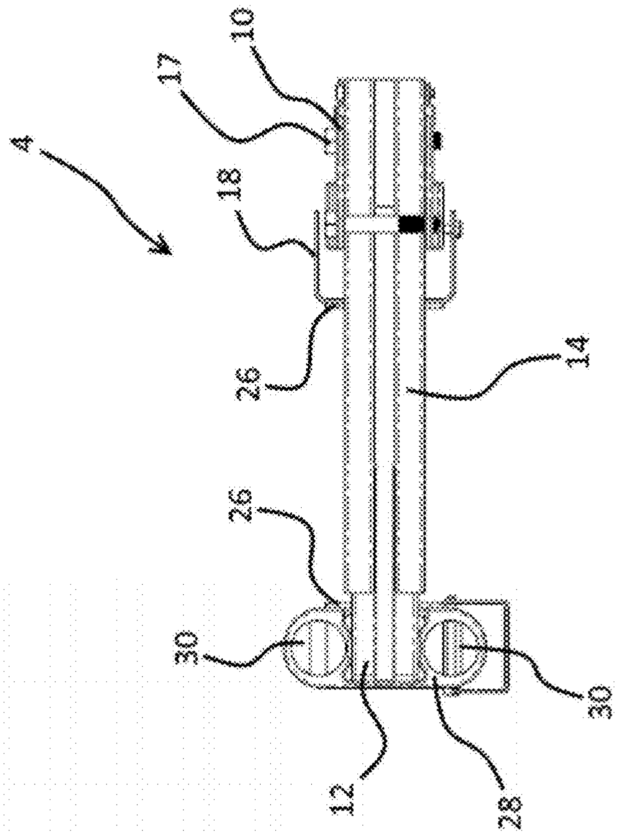
Figure 2C:
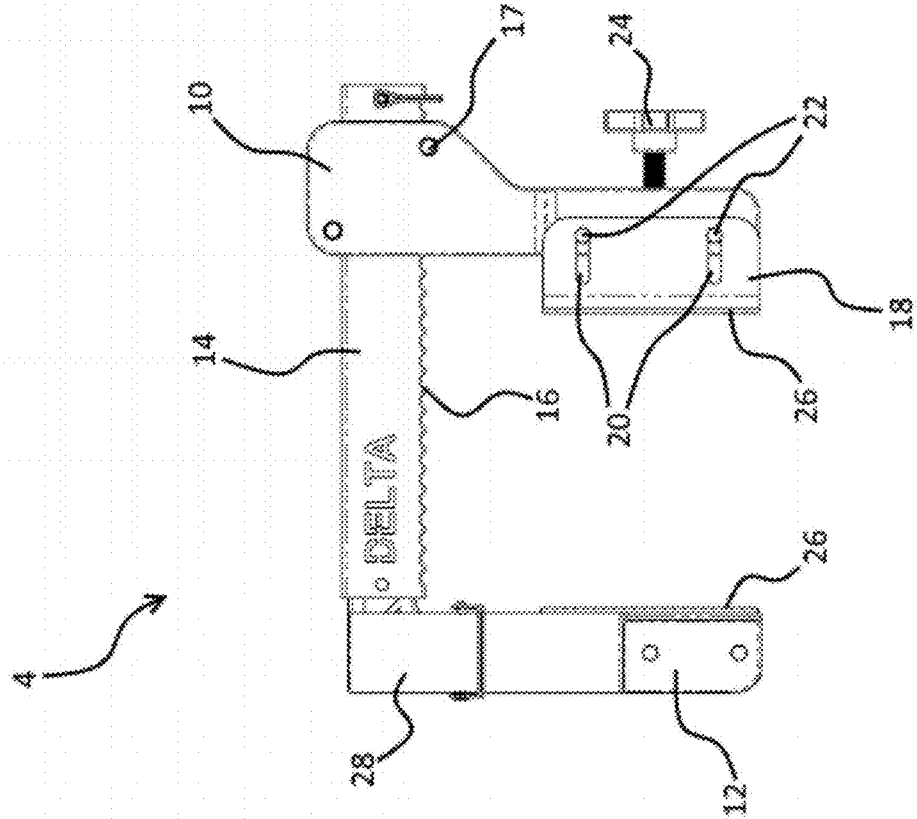
Figure 5A:
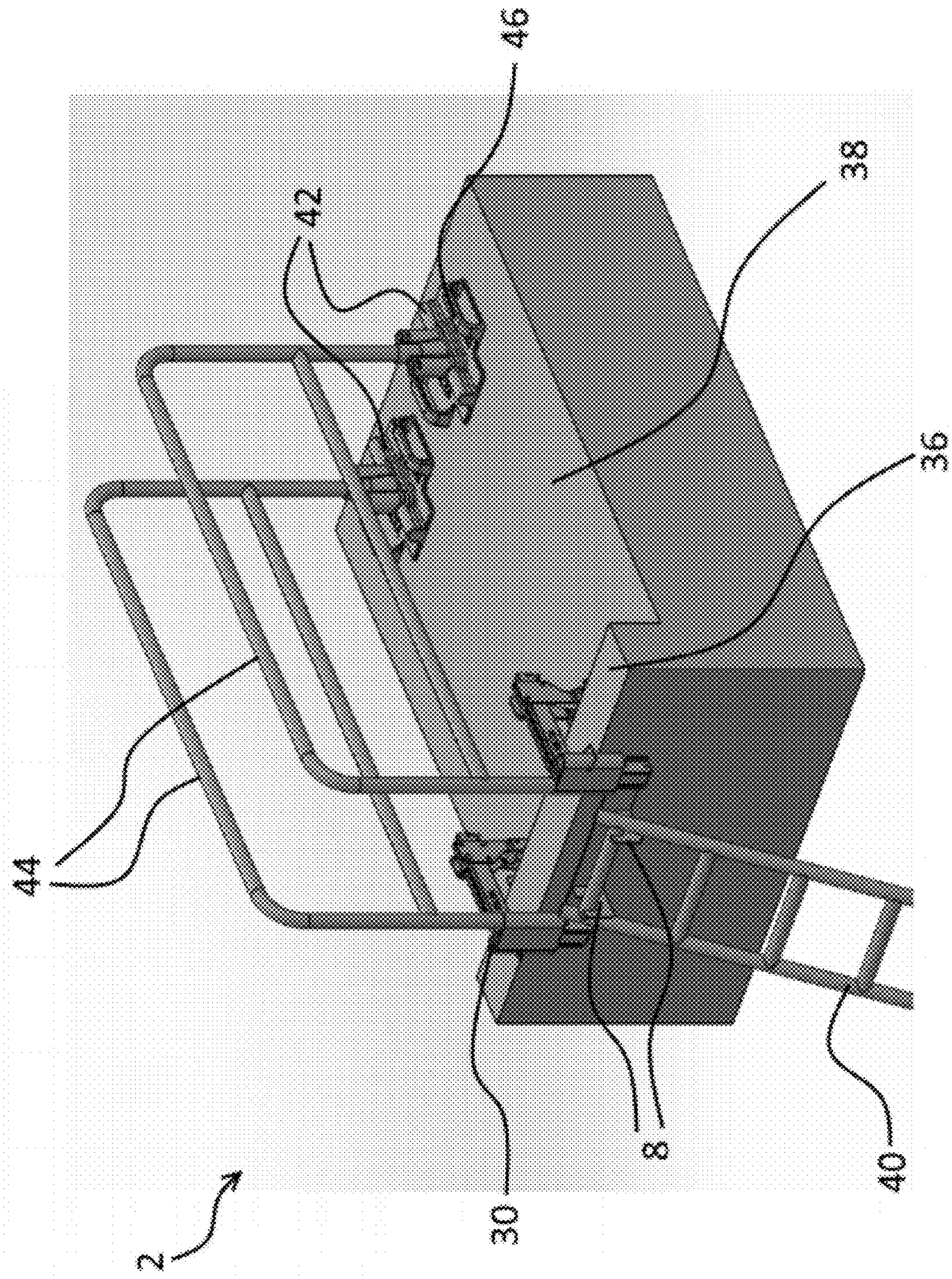
FIGS. 5A and 5B show respective front and rear perspective views of a ladder safety device, according to an additional embodiment of the present invention.

Referring to FIGS. 1A, 1B, and 5A there is shown a ladder safety device 2, according to a preferred embodiment of the present invention. Ladder safety device 2 allows a ladder 40 to be securely and removably attached to a rooftop 38, for example by attaching to a parapet wall 36. Ladder safety device 2 includes a pair of support clamps 4 which are securable to the parapet wall 36, as will be discussed in further detail below. The support clamps 4 are connected to each other via an elongate plate 6, and as such are arranged in parallel and spaced apart sufficiently to allow the ladder to be positioned between them. The elongate plate 6 includes a pair of ladder hooks 8 configured to securely receive a rung of the ladder 40. As such, in order to secure the ladder 40 to the parapet wall 36, the pair of support clamps 4 are first clamped to the parapet wall 36. Then, the ladder 40 is placed between the support clamps 4 such that the rung of the ladder 40 roughly coinciding with the height of the building when the ladder 40 is appropriately angled may be received by the ladder hooks 8. At this point, a user may utilize the ladder 40 in a safe manner. When the ladder 40 is no longer needed, it is easily removable from the ladder hooks 8, and the support clamps 4 may be unclamped from the parapet wall 36. In an embodiment, the support clamps 4, the elongate plate 6 and the ladder hooks 8 are made from aluminum to minimize the weight of the ladder safety device 2 while maintaining sufficient strength and rigidity.

Referring now to FIGS. 2A to 2D, each support clamp 4 includes a first support member 10, a second support member 12, and an extended arm 14 joining the first support member 10 to the second support member 12. In order to accommodate various parapet wall thicknesses, the width of each support clamp 4 is adjustable. In an embodiment, this width is adjustable on both a macro and micro scale. For macro adjustments, the extended arm 14 includes ribbings 16 on its underside, and the first support member 10 includes a bolt 17 that is engageable with the ribbings 16. As such, the width of each support clamp 4 is adjustable by selecting a different ribbing 16 along the extended arm 14 to engage with the bolt 17. Once the width of each support 4 is adjusted to roughly match that of the parapet wall, micro adjustments may be made via a C-shaped bracket 18 telescopically connected to the first support member 10. C-shaped bracket 18 includes a plurality of elongate slots 20, each configured to receive a fastener 22 fastened to the first support member 10. C-shaped bracket 18 is further connected to the first support member 10 via a threaded fastener 24, illustratively shown as a handle attached to a screw. As such, the C-shaped bracket 18 is displaceable towards and away from the first support member 10 via rotation of the threaded fastener 24, the movement of the C-shaped bracket 18 guided by the fasteners 22 sliding in the elongate slots 20, in order to adjust the width of each support clamp 4 on a micro scale. Further, the second support member 10 may include an attachment 28 comprising one or more slots 30, as will be discussed in further detail below. The macro and micro adjustability of the width of each support 4 ensures that the ladder safety device 2 may be appropriately attached to the parapet wall in a safe and secure manner.

Still referring to FIGS. 2A to 2D, each support clamp 4 is connected to its complementary support clamp 4 via the elongate plate 6 which attaches to each support clamp 4 at the second support member 12. In an embodiment, a pair of pads 26 are installed on the insides of both first support member 10 and second support member 12 such that the pads 26 are facing each other. The pads 26 allow the pressure of each support clamp 4 to be evenly distributed against a surface of the parapet wall and offer increased friction to ensure a solid and secure connection. In an embodiment, the pads 26 are made of one of rubber or hard plastic. As such, the ladder safety device 2 is installable and removable from the parapet wall without necessitating any drilling and without damaging or leaving any marks on the parapet wall.

Figure 3B:
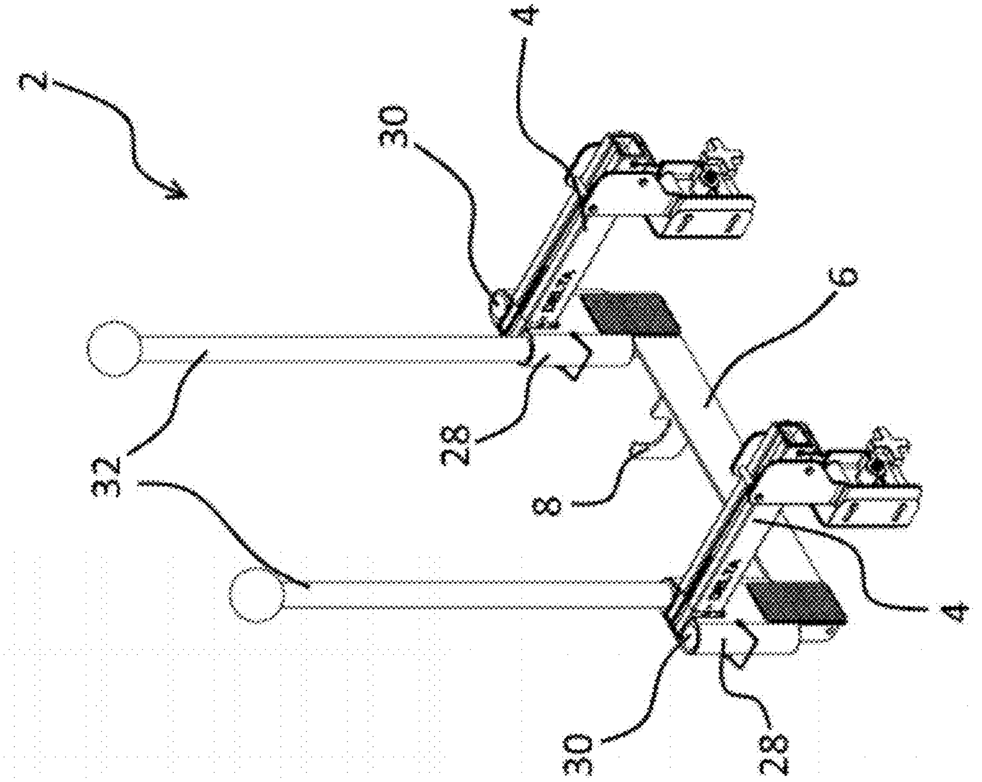
FIGS. 3A and 3B show respective front perspective and rear perspective views of the ladder safety device of FIGS. 1A and 1B with optional hand rails.
Figure 3A:
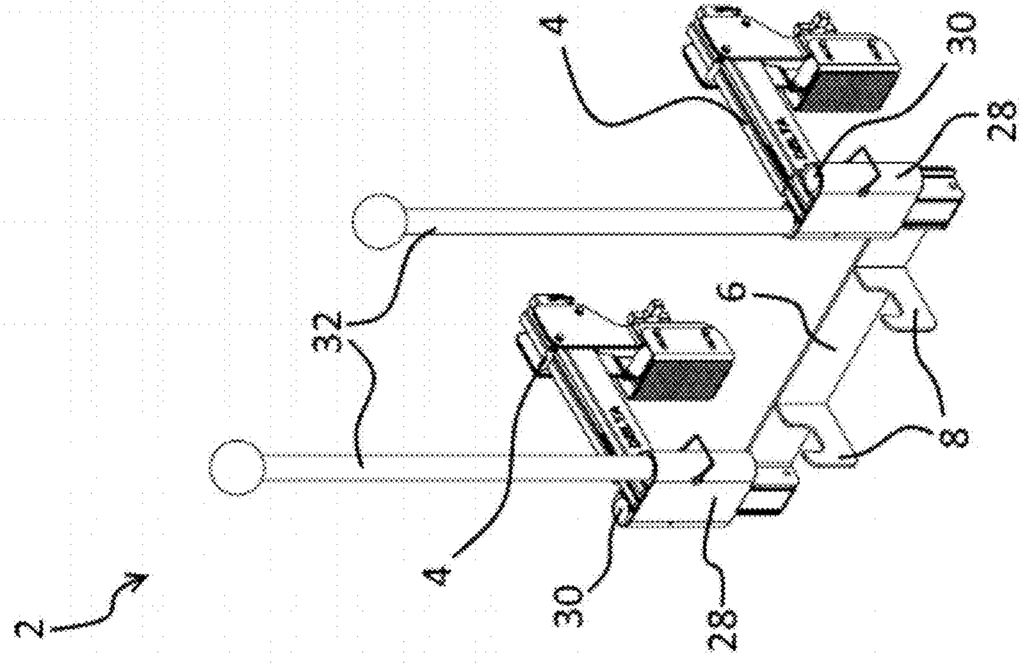

Referring now to FIGS. 3A and 3B, ladder safety device 2 is shown with a pair of optional hand rails 32. Each hand rail 32 is insertable in a respective slot 30 in attachment 28, preferably an inner slot 30. The hand rails 32 are positioned in parallel to each other and are installed in slots 30 solidly enough to at least partially support the weight of a user. When the ladder is installed via the ladder hooks 8, the user may grasp the hand rails 32 when climbing or descending the ladder to maintain their balance and minimize the risk of a fall. As such, the hand rails 32 are spaced apart sufficiently to allow unencumbered access to the ladder and offer a wide grip for the user. In an embodiment, a locking mechanism (not shown) in each slot 30 ensures that the hand rails 32 are secured to the attachment 28 and will not release unexpectedly.

Figure 4A:
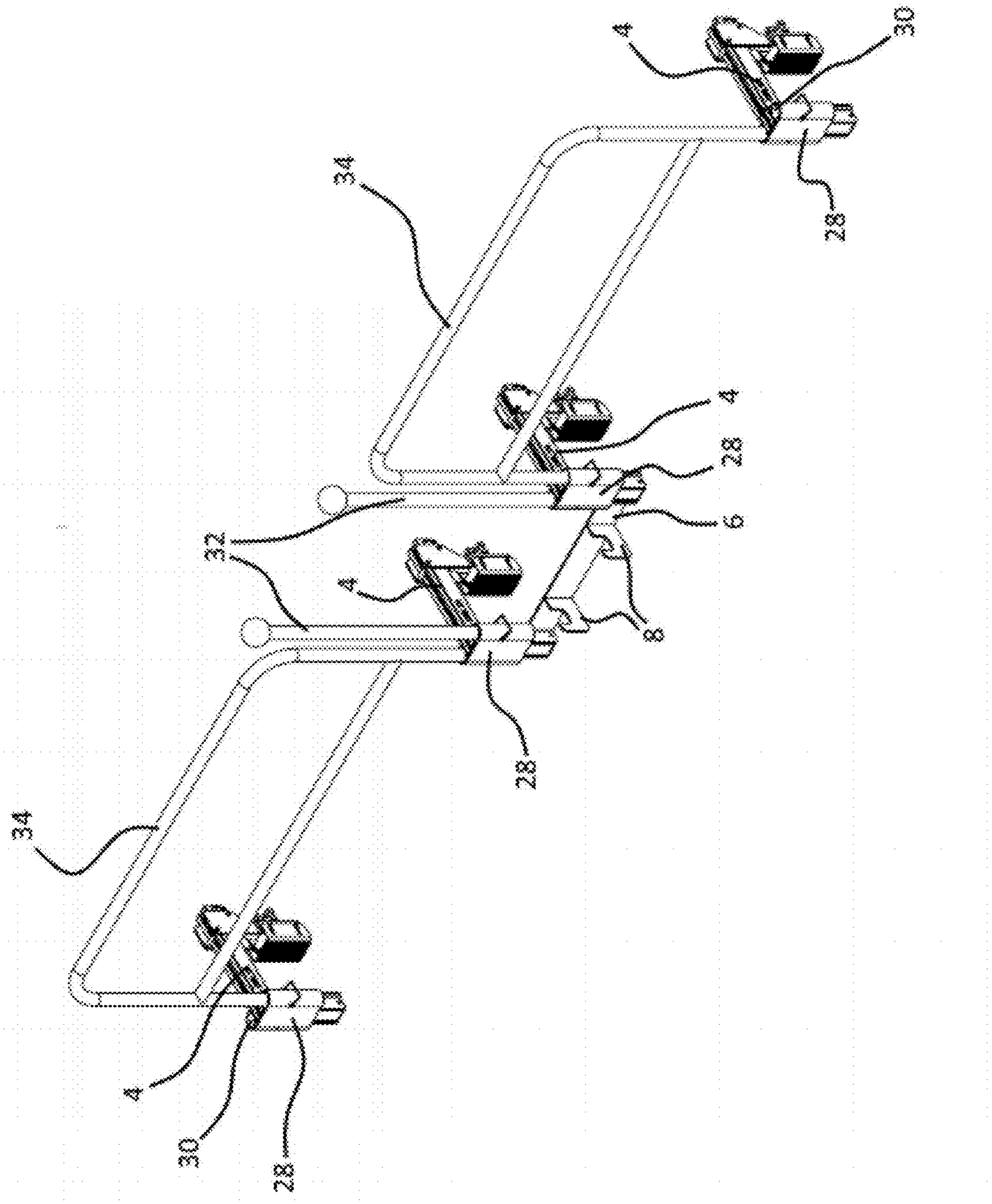
FIGS. 4A and 4B show respective front perspective and rear perspective views of a pair of the ladder safety devices of FIGS. 1A and 1B with optional hand rails and guard rails.
Figure 4B:
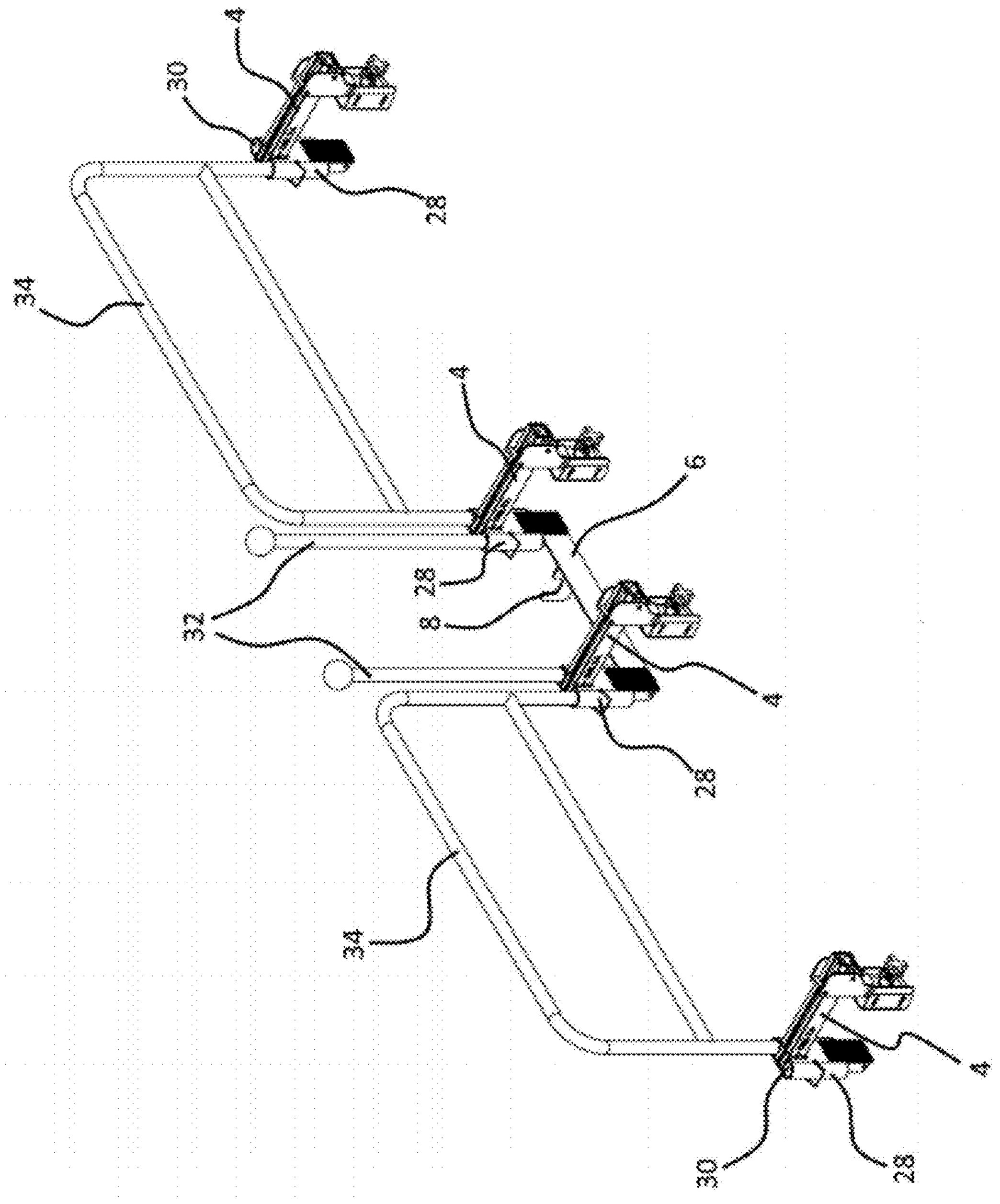

Referring now to FIGS. 4A and 4B, in an embodiment, additional support clamps 4 may be installed on a given parapet wall to allow for the installation of one or more guard rails 34 along the parapet wall, for instance to prevent nearby people from accidentally falling off the roof. An end of each guard rail 34 may be inserted into a respective slot 30 in an attachment 28, preferably an outer slot 30 so that an inner slot 30 may be used for a hand rail 32. As shown in FIGS. 4A and 4B, additional support clamps 4 may be installed along the parapet wall and positioned to receive the opposite end of an installed guard rail 34. In an alternate embodiment, rather than a single additional support clamp 4 installed at each end of the installed guard rails 34, a complete additional ladder safety device 2 may be installed such that a ladder may be used at various positions along the parapet wall. As with the hand rails 34, the ends of the guard rails 34 can be secured inside their respective slots 30 via a locking mechanism to prevent the guard rails 34 from releasing unexpectedly, thus minimizing the risk of injury.

Figure 5B:
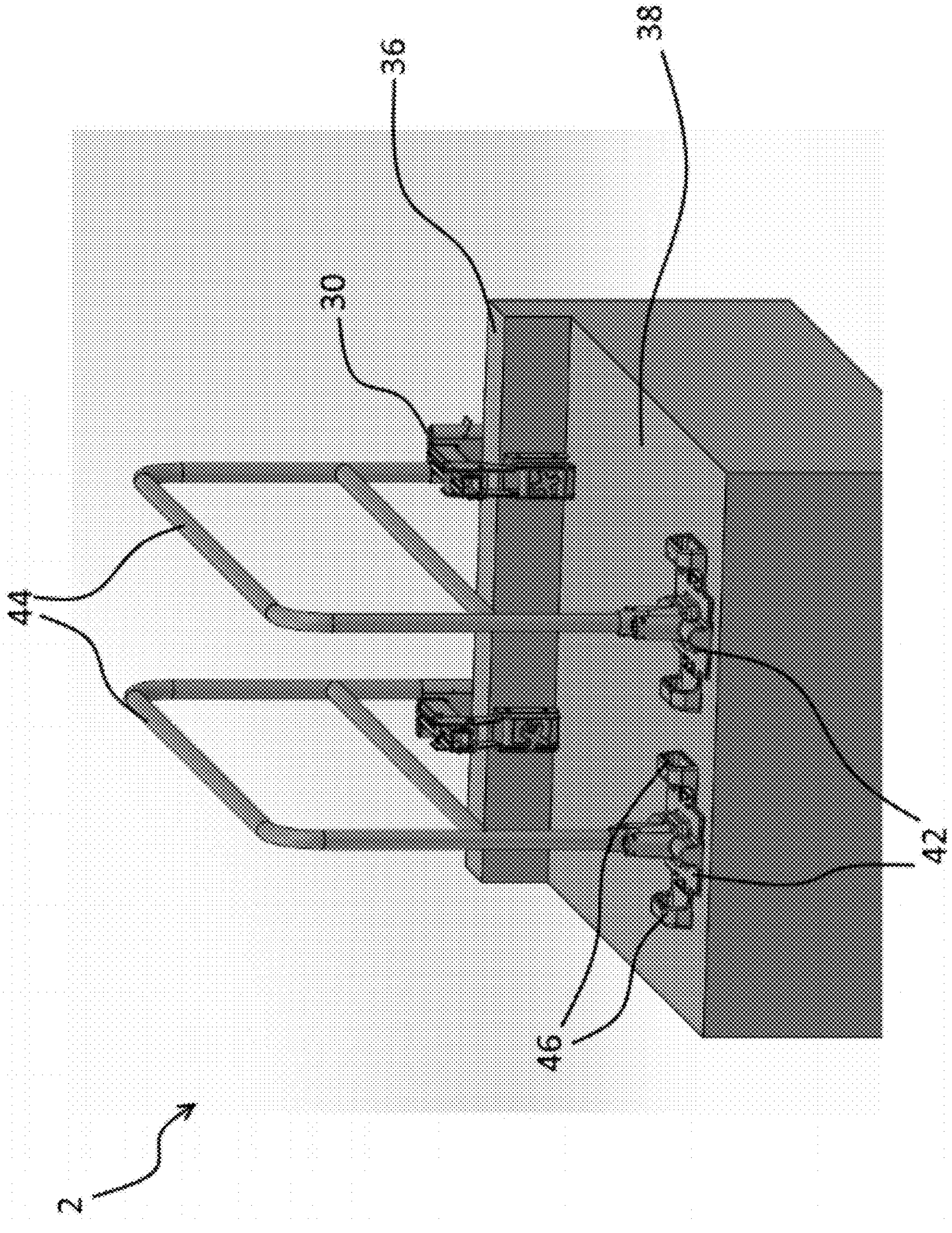
Figure 6:
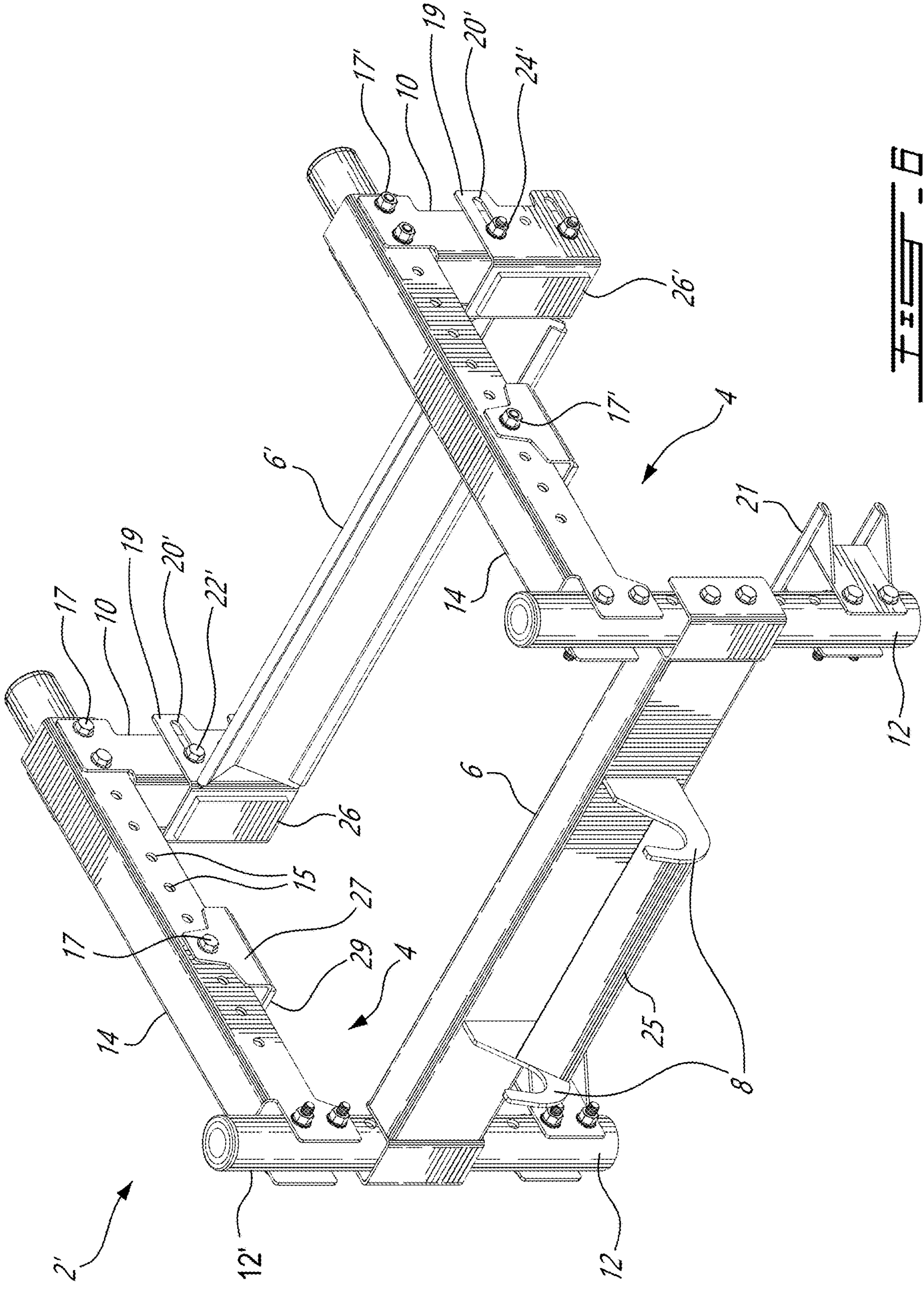
FIG. 6 is a front perspective view of a ladder safety device, according to another preferred embodiment of the present invention.

Referring now to FIGS. 5A and 5B, an alternate embodiment of a ladder safety device 2 is shown. As described above, a pair of support clamps 4 secure the ladder safety device 2 to a parapet wall 36 of a rooftop 38, and a ladder 40 is securely receivable by a pair of ladder hooks 8. To provide additional support to the ladder safety system 2, at least one additional rail 44, illustratively two additional rails 44, is insertable into a respective slot 30 at one end and includes a counterweight 42 at another end. Each counterweight 42 engages with the rooftop 38 and as such increases the weight capacity of the ladder safety device 2 and ensures that the ladder 40 remains secure when a user is climbing or descending it. In various embodiments, the length of each additional rail 44 and weight of each counterweight 42 can be selected based on the additional support required. Each counterweight 42 may comprise one or more handles 46 to assist in their placement or removal. This alternate embodiment would be useful for installing on a rooftop 38 including a parapet wall 36 that is fragile or not solid/sturdy enough to support the weights and forces exerted thereon.

In another alternate embodiment of the present invention, a ladder safety device 2 may be configured for installation on a rooftop 38 that does not include a parapet wall 36. In such an embodiment, ladder 40 is once again securely receivable by a pair of ladder hooks 8 installed along an elongate plate 6 positioned adjacent to the edge of the rooftop 38. At least one additional rail 44 is connected to the elongate plate 6 at one end and a counterweight 42 at another end thereof. As such, each counterweight 42 counters the weight of the user using the ladder 40 to ensure their safety when climbing or descending.

Figure 7:
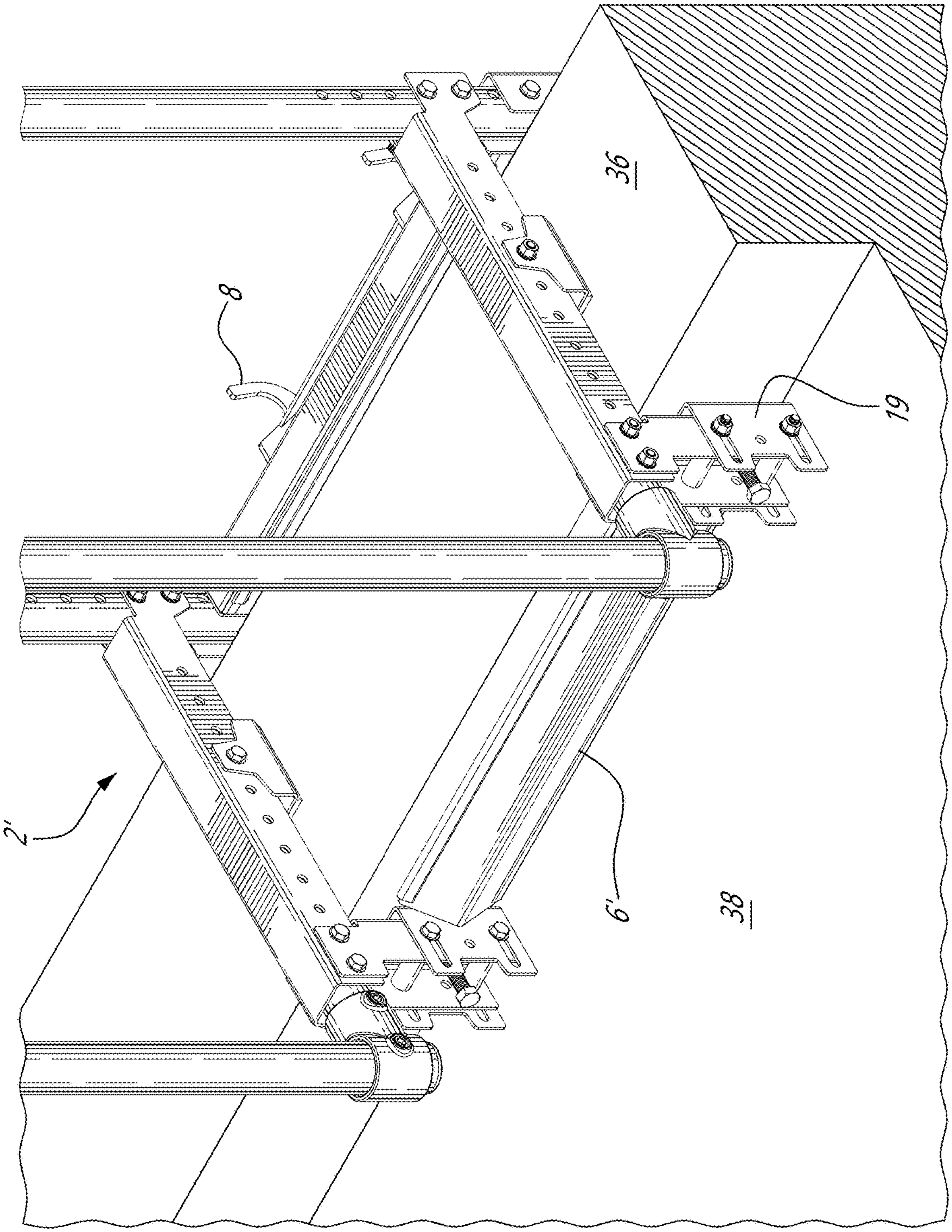
FIG. 7 is a rear perspective view of the ladder safety device shown in FIG. 6, installed on a parapet wall of a rooftop, in a first position.
Figure 8:
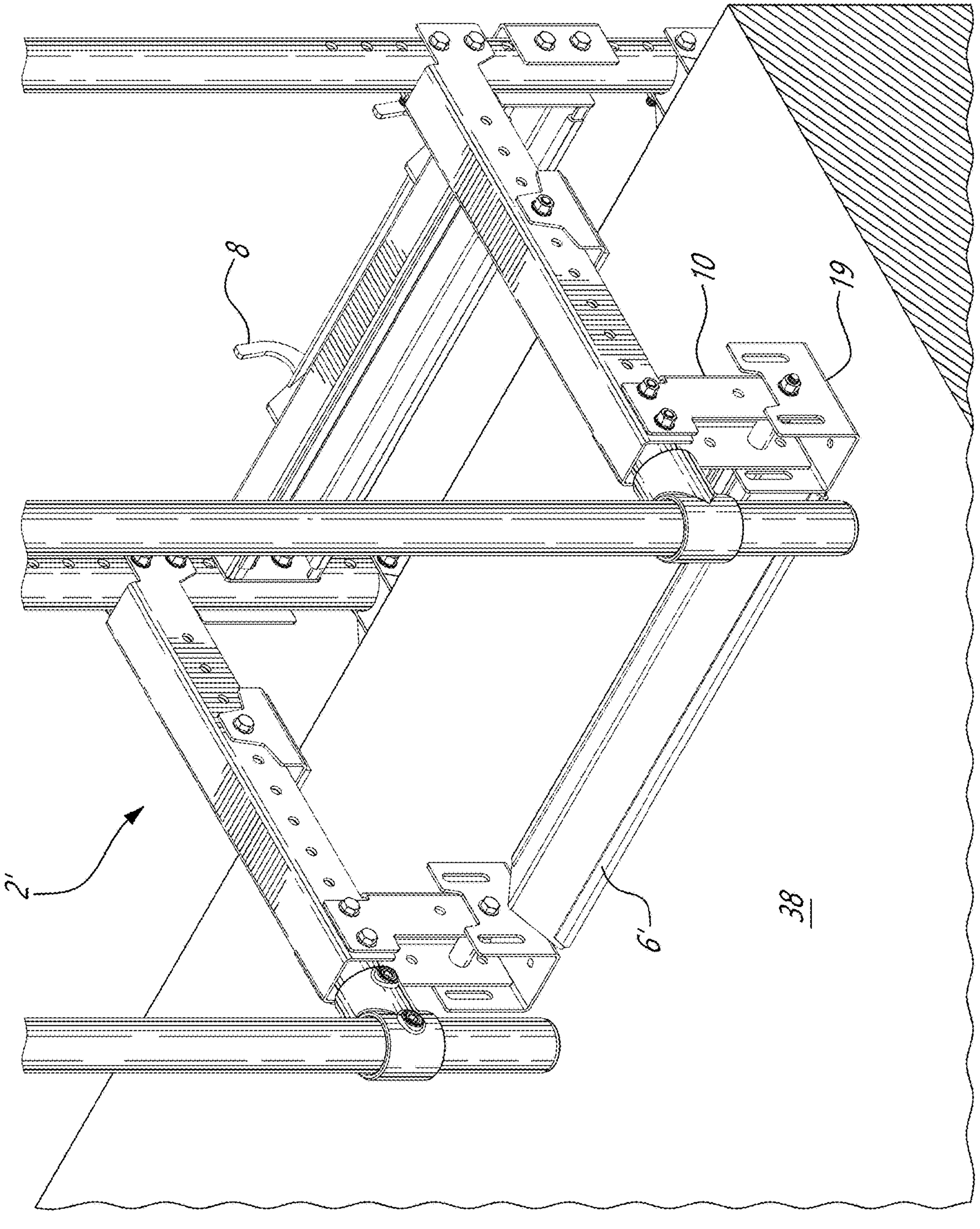
FIG. 8 is a rear perspective view of the ladder safety device shown in FIG. 6, installed on a rooftop, in a second position.
Figure 9:
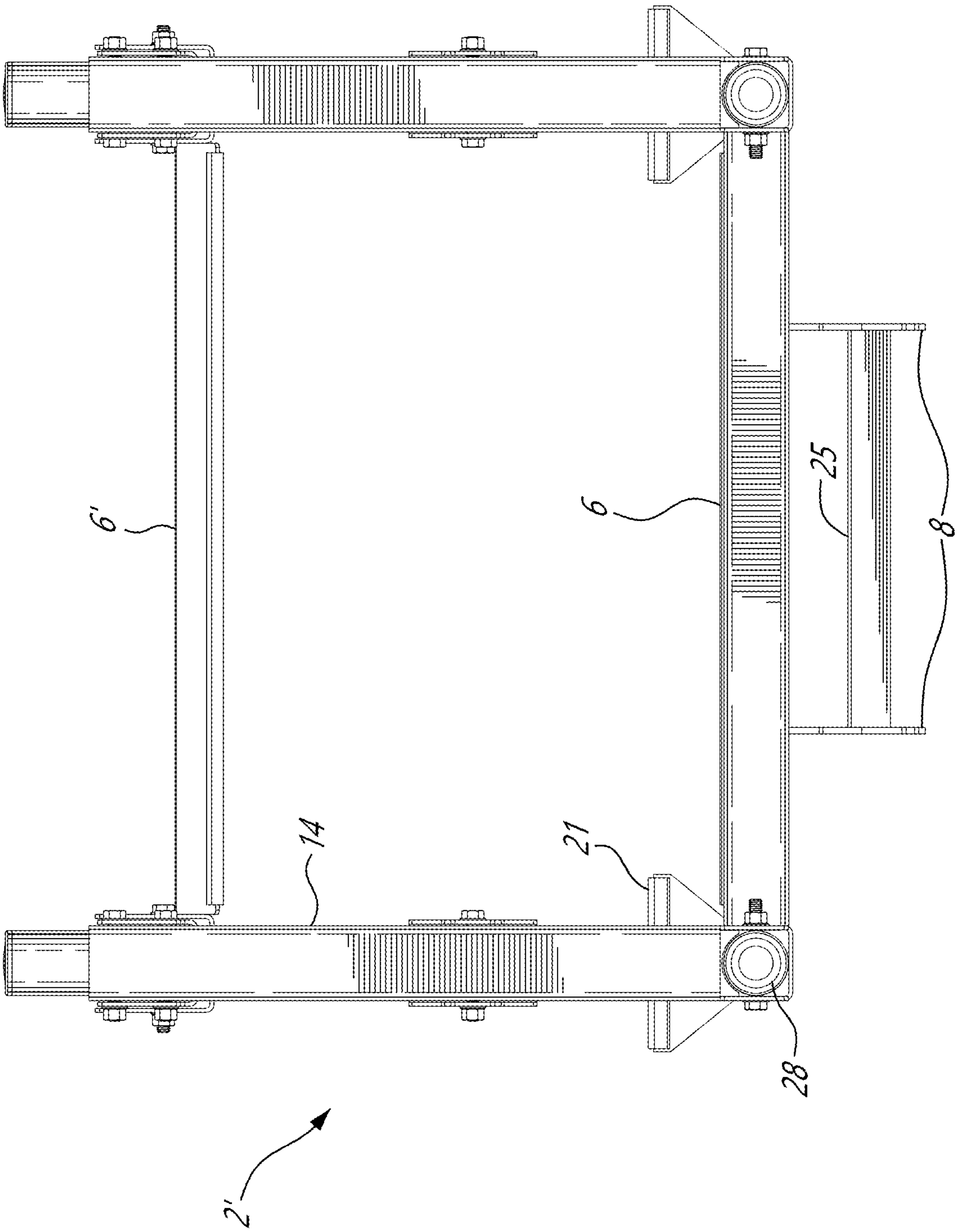
FIG. 9 is a top plan view of the ladder safety device shown in FIG. 6.
Figure 10:
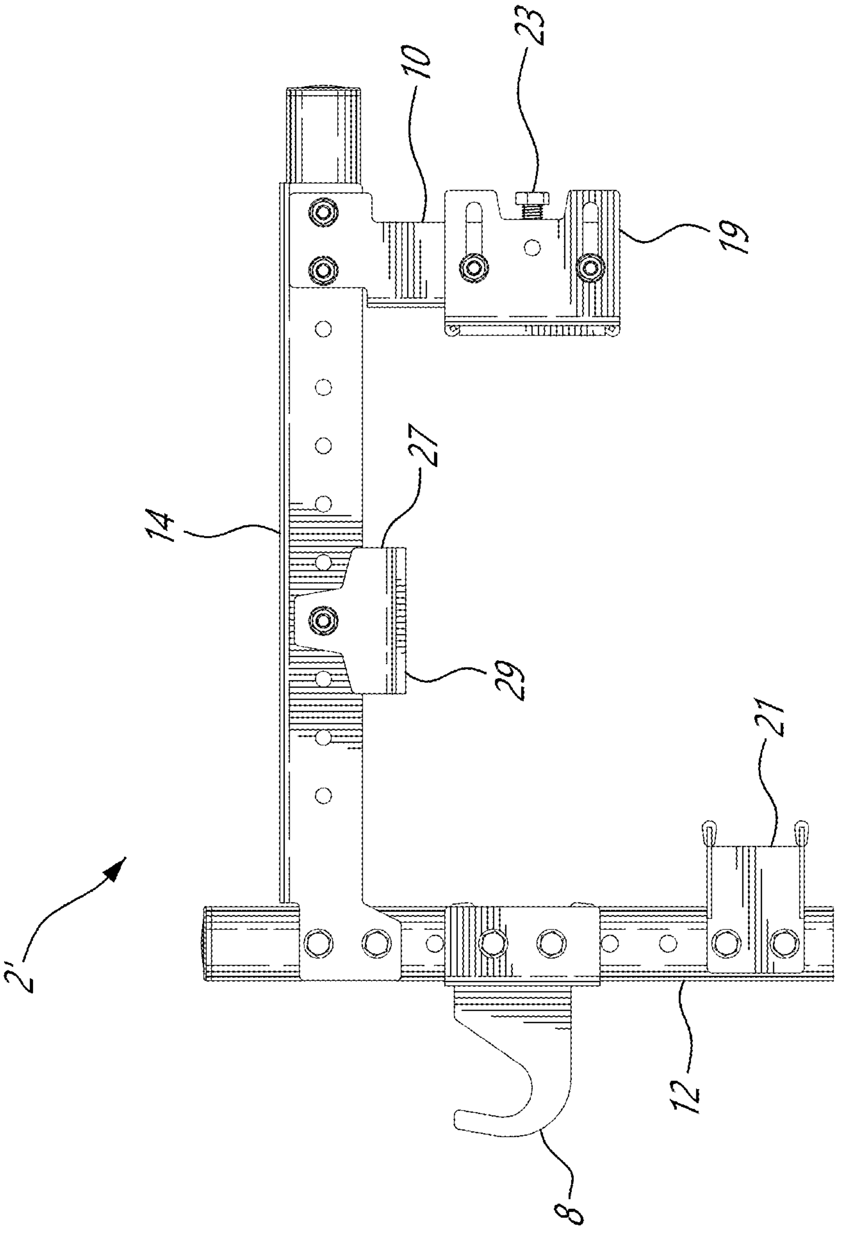
FIG. 10 is a side elevational view of the ladder safety device shown in FIG. 6.
Figure 11:
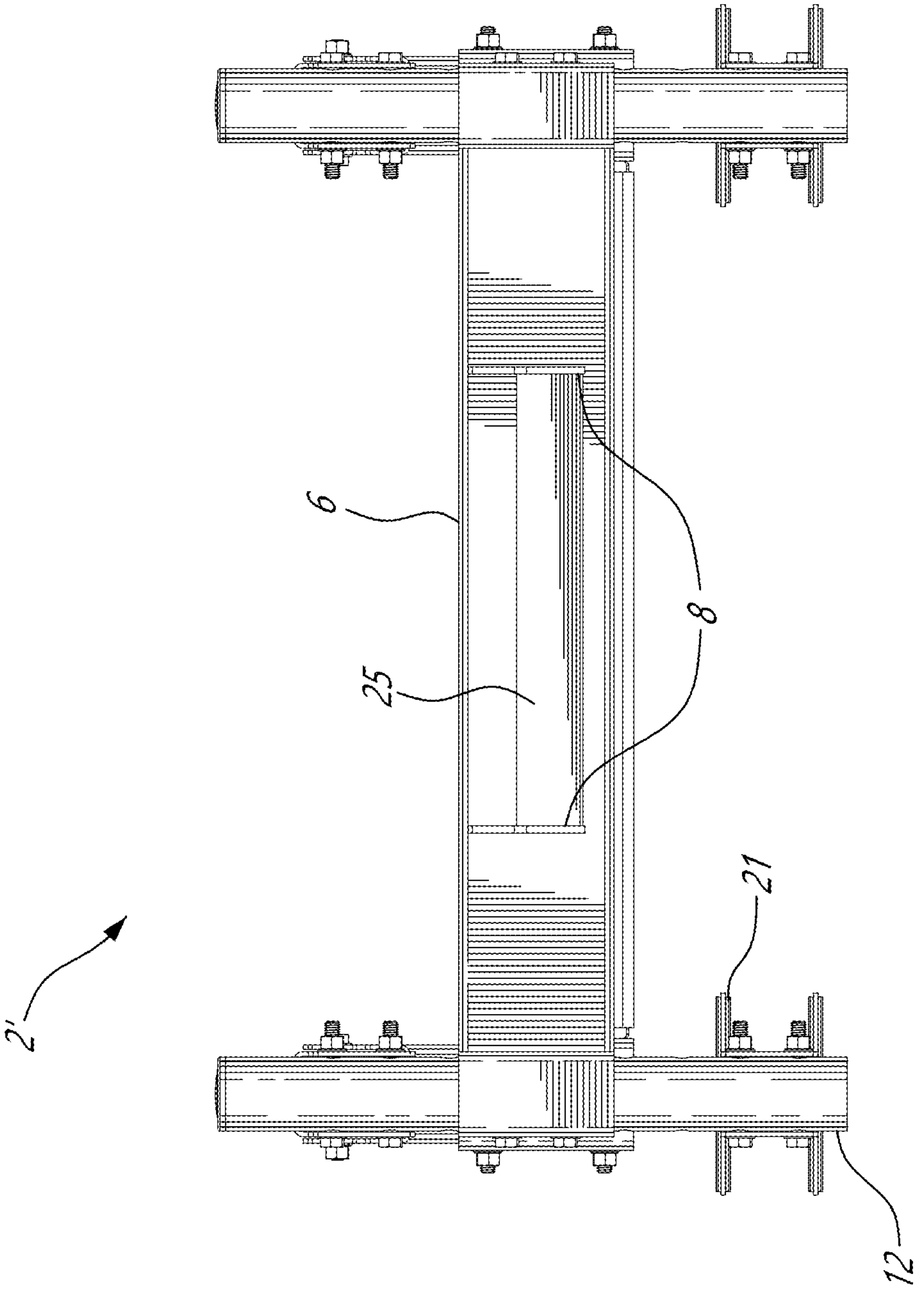
FIG. 11 is a front elevation view of the ladder safety device shown in FIG. 6.
Figure 17:
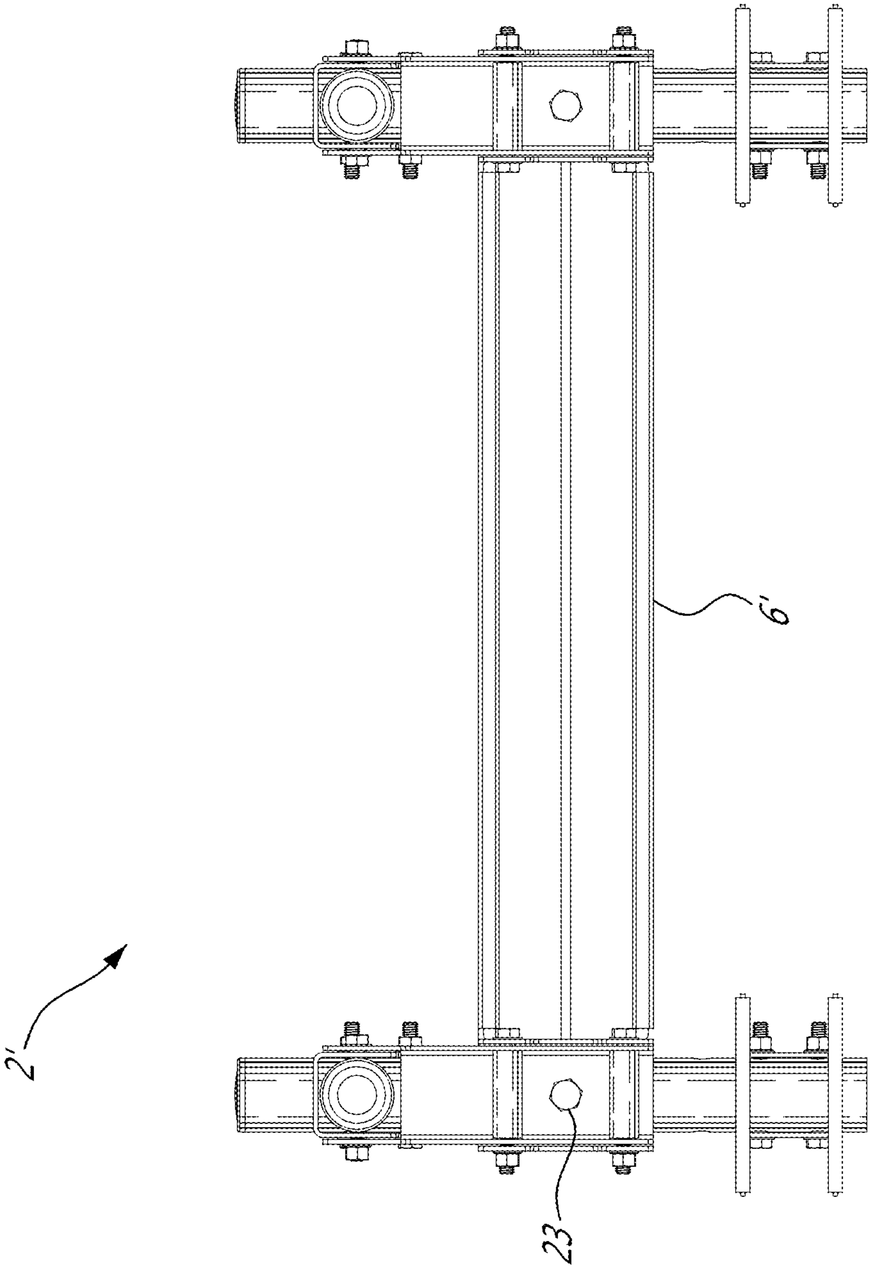
Figure 13:
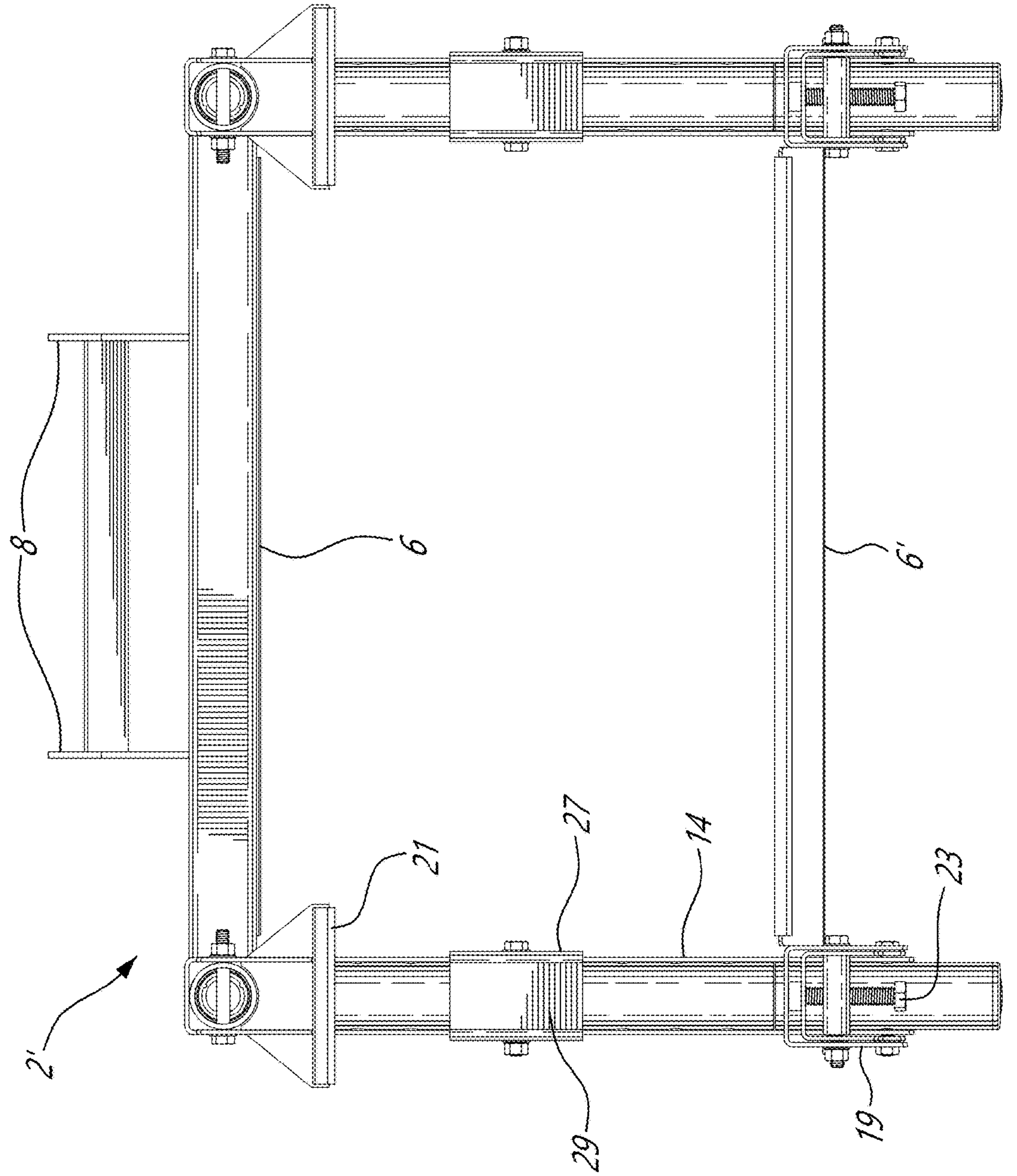
FIG. 13 is a bottom plan view of the ladder safety device shown in FIG. 6.

Referring to FIGS. 6 to 16, there is shown a ladder safety device 2', according to another preferred embodiment of the present invention. Ladder safety device 2' allows the ladder 40 (shown in FIG. 5A) to be securely and removably attached to a rooftop 38 that may or may not include a parapet wall 36. Ladder safety device 2' includes a pair of support clamps 4 which are securable to the parapet wall 36. Each said support clamp 4 includes a first support member 10, a second support member 12, and an extended arm 14 joining the first support member 10 to the second support member 12. Similar to the above embodiments, a distance between the support members 10, 12 defines a width adjustable to the width of the parapet wall 36. An elongate plate 6 connects the pair of support clamps 4 to each other. A pair of ladder hooks 8 are attached to the elongate plate 6 for securely receiving a rung of the ladder 40. A reinforcement elongate plate 25 connects the two hooks 8 together for reinforcing sturdiness. The extended arm 14 includes a plurality of through holes 15 that are longitudinally spaced apart from each other. A male fastener 17 such as a screw is engageable into one through hole 15. A female fastener 17', such as a bolt, is securable to the male fastener 17. Depending on the through hole 15 that is chosen, it is possible to selectively adjust the width of each said support clamp 4. A swiveling bracket 19 is connectable to the first support member 10, at the bottom thereof. The swiveling bracket 19 is pivotable between a first position where the bracket 19 is operatively secured against the parapet wall 36 as shown in FIG. 7 and a second position where the bracket 19 operatively rests onto the rooftop 38 as shown in FIG. 8. The swiveling bracket 19 is secured in place in the first position by means of a threaded fastener 23 attached to the first member 10 as best seen in FIGS. 10 to 13. An elongate plate 6' connects together each of the swiveling brackets 19. The elongate bracket 6' has a triangular shape that can be fitted against the parapet wall 36. The swiveling bracket 19 is telescopically connectable to the first support member 10 via the elongate slots 20' thereon. A male fastener 22', such as a screw, is engageable into one elongate slot 20' via a through hole on the first support member 10 and secured with a female fastener 24', such as a bolt, on the other side. Each support clamp 4 is thereby adjustable by adjusting the distance between the swiveling bracket 19 and the first support member 10 along the elongate slots 20' via the male fastener 22' and the female fastener 24'. Each second support member 12 includes an end 12' for attachment to at least one of a hand rail 32 (shown in FIG. 3A) or a guard rail 34 (shown in FIG. 4A) or additional guard rail 44. The swiveling bracket 19 includes a pad 26' for applying pressure against the parapet wall 36 when in the first position or for resting on the rooftop 38 when in the second position. The extended arm 14 includes a bracket 27 connectable to the extended arm 14 via a male fastener 17, such as bolt, and a female fastener 17', such as a screw, on opposite sides of the through holes 15. The male fastener 17 is engageable into one of the through holes 15 and securable to the female fastener 17' for selectively adjusting a longitudinal position of the bracket 27 along the extended arm 14. The bracket 27 includes a pad 29 for applying pressure to the parapet wall 36. The second member 12 also includes through holes separated longitudinally for attachment to the extended arm 14 above, the elongate plate 6 in the middle and a bracket 21 at the bottom thereof. The bracket 21 is engageable against the parapet wall 36.

Referring back to FIGS. 14 to 16, to provide additional support to the ladder safety system 2', at least one additional rail 44, illustratively two additional rails 44, extending toward the middle of the roof 38 is attachable to end 12' of the second member 12 at one end and includes a counterweight 42 at another end. Each counterweight 42 engages with the rooftop 38 and as such increases the weight capacity of the ladder safety device 2' and ensures that the ladder 40 remains secure when a user is climbing or descending it. In various embodiments, the length of each additional rail 44 and weight of each counterweight 42 can be selected based on the additional support required. The counterweights 42 may be connected to one another by means of an elongate plate 50 to increase stability. This alternate embodiment would be useful for installing on a rooftop 38 including a parapet wall 36 that is fragile or not solid/sturdy enough to support the weights and forces exerted thereon.

In the examples given above, two ladder hooks 8 are used to securely receive a rung of the ladder 40. A single ladder hook 8 may be used, but the ladder 40 would be made less stable as it could shift laterally. To prevent this lateral shift when using a single hook, perpendicular stubs or bars may connected on the elongated so as to abut against each side of the top of the ladder 40. Also, instead of ladder hooks 8, other holding means for receiving the top end of the ladder may be used to achieve a similar function or purpose. For example, one could use magnets that are attached to the end of the ladder 40 and the elongate plate 6, but these would need to be strong enough for safety purposes and would be relatively more expensive than the hooks. As another example, one could use a frame where the top of the ladder would rest without using any hooks for receiving a run of the ladder, but this would make the ladder unsafe as the top of the ladder could slip backwards, the ladder fall and potentially injure the user.

An advantage of using the ladder hooks 8 is that the top of the ladder 40 does not extend significantly, or not at all, above of the rooftop 38 or the parapet wall 36. This allows the user to directly pass through in between the two clamps 4, in between the two hand rails 32 or rail guards 34, 44 instead of having to pass on either side of the top of the ladder 40, which could be unsafe.

Figure 14:
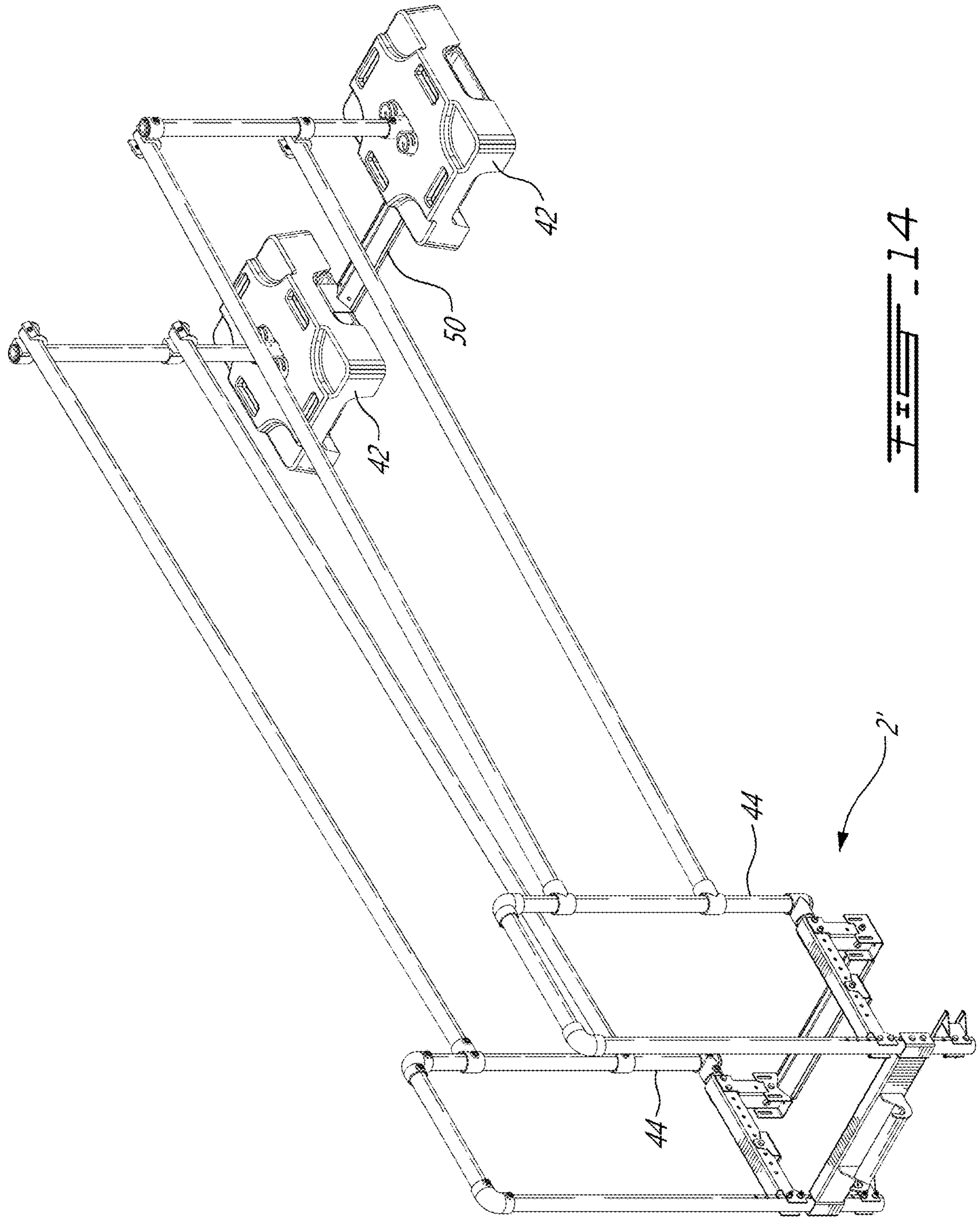
FIG. 14 is a perspective front view of the ladder safety device shown in FIG. 6 with guard rails and counterweights.
Figure 15:
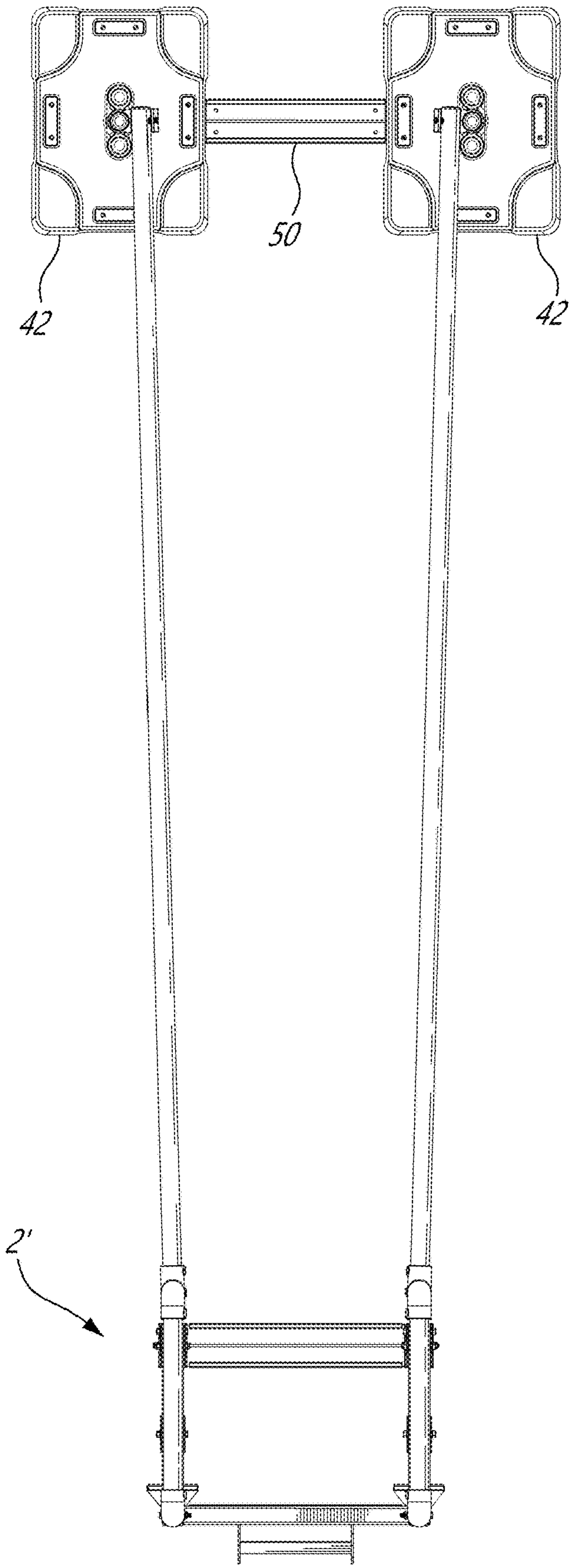
FIG. 15 is a top plan view of the ladder safety device shown in FIG. 14.
Figure 16:
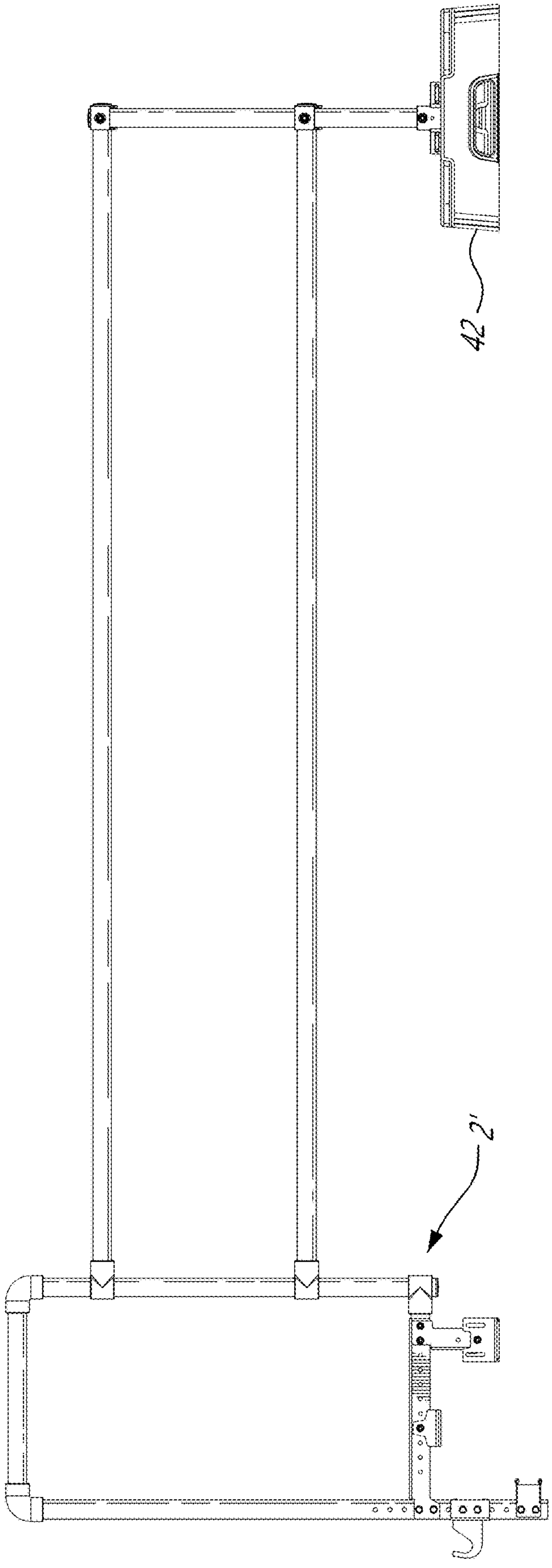
FIG. 16 is a side elevational view of the ladder safety device shown in FIG. 14.

An advantage of having the rail guards 44 extending perpendicularly from the side of the rooftop 44 and/or toward the center of the rooftop 38, as shown in FIG. 14, is to increase stability of the ladder safety system 2' as the counterweights 42 are located further away from the side of the rooftop 38 as compared to the rail guards 34 extending parallel to the side of the rooftop 38, as shown in FIGS. 4A and 4B.

Advantageously, to increase user security and restrict access to the ladder 40, a swiveling barrier may be installed in between both the rail guards 44 and the counterweights 42.

The scope of the claims should not be limited by the preferred embodiments set forth in the examples, but should be given the broadest interpretation consistent with the description as a whole.

The invention claimed is:

1. A ladder safety device for removably securing a ladder to a parapet wall of a rooftop, comprising:
- a pair of support clamps securable to the parapet wall, each said support clamp comprising a first support member, a second support member, and an extended arm joining said first support member to said second support member, wherein a distance between said support members defines a width adjustable to the width of the parapet wall;
- an elongate plate connecting said pair of support clamps to each other; and
- at least one ladder hook extending from said elongate plate for securely receiving a rung of the ladder; and
- a swiveling bracket connectable to said first support member, said swiveling bracket being pivotable between a first position where the bracket is operatively secured against the parapet wall and a second position where the bracket operatively rests onto the rooftop;
- wherein said swiveling bracket is telescopically connectable to said first support member via at least one elongate slot, a male fastener and a female fastener, wherein said width of each support clamp is adjustable by adjusting the distance between said swiveling bracket and said first support member along said elongate slot via said male fastener and said female fastener.

2. The ladder safety device of claim 1, wherein said extended arm comprises a plurality of through holes longitudinally spaced apart from each other along said extended arm and said first support member comprises at least one male fastener and female fastener, each said male fastener being engageable into one of the through holes and securable to said female fastener for selectively adjusting said width of each said support clamp.

3. The safety device of claim 1, wherein said extended arm comprises a plurality of ribbings and said first support member comprises a bolt, each said ribbing engageable with said bolt to selectively adjust said width of each said support clamp.

4. The ladder safety device of claim 1, wherein at least one of said first support member and second support member comprises an end removably connectable to at least one of a hand rail or a guard rail.

5. The ladder safety device of claim 1, wherein said swiveling bracket comprises a pad for applying pressure against the parapet wall when in the first position or for resting on the rooftop when in the second position.

6. The ladder safety device of claim 1, wherein each of said first support member and said second support member comprises a pad for applying pressure against the parapet wall.

7. The ladder safety device of claim 1, wherein said extended arm comprises a plurality of through holes and a bracket connectable to said extended arm via a male fastener and a female fastener on opposite sides of said through holes, said male fastener being engageable into one of the through holes and securable to said female fastener for selectively adjusting a longitudinal position of said bracket along said extended arm, said bracket comprising a pad for applying pressure to said parapet wall.

8. The ladder safety device of claim 6, wherein each said pad is made from one of rubber or hard plastic.

9. The ladder safety device of claim 1, wherein said pair of support clamps, said elongate plate and said pair of ladder hooks are each made from aluminum.

10. The ladder safety device of claim 4, comprising two guard rails extending perpendicularly with respect to a side of the rooftop at a first end and a counterweight at a second end, said counterweight engaging with the rooftop to counter the weight of a user using the ladder.

11. A ladder safety device for removably securing a ladder to a parapet wall of a rooftop, comprising:
- a pair of support clamps securable to the parapet wall, each said support clamp comprising a first support member, a second support member, and an extended arm joining said first support member to said second support member, wherein a distance between said support members defines a width adjustable to the width of the parapet wall;
- a swiveling bracket in each support clamp connectable to said first support member, said swiveling bracket being pivotable between a first position where the bracket is operatively secured against the parapet wall and a second position where the bracket operatively rests onto the rooftop;
- an elongate plate connecting said pair of support clamps to each other; and
- holding means for supporting said ladder;
- wherein said swiveling bracket is telescopically connectable to said first support member via at least one elongate slot, a male fastener and a female fastener, wherein said width of each support clamp is adjustable by adjusting the distance between said swiveling bracket and said first support member along said elongate slot via said male fastener and said female fastener.

12. The ladder safety device of claim 11, wherein said holding means comprise at least one ladder hook extending from said elongate plate for securely receiving a rung of the ladder.

* * * * *